Feb. 7, 1950 E. A. GOLDBERG 2,496,994

FREQUENCY DIVIDING NETWORK

Filed Dec. 22, 1945

INVENTOR.
Edwin A. Goldberg
BY
ATTORNEY

Patented Feb. 7, 1950 2,496,994

UNITED STATES PATENT OFFICE 2,496,994

FREQUENCY DIVIDING NETWORK

Edwin A. Goldberg, Princeton, N. J., assignor to Radio Corporation of America, a corporation of Delaware Application December 22, 1945, Serial No. 636,969

2 Claims. (Cl. 250—36)

Figures 1, 2, 3, 4:
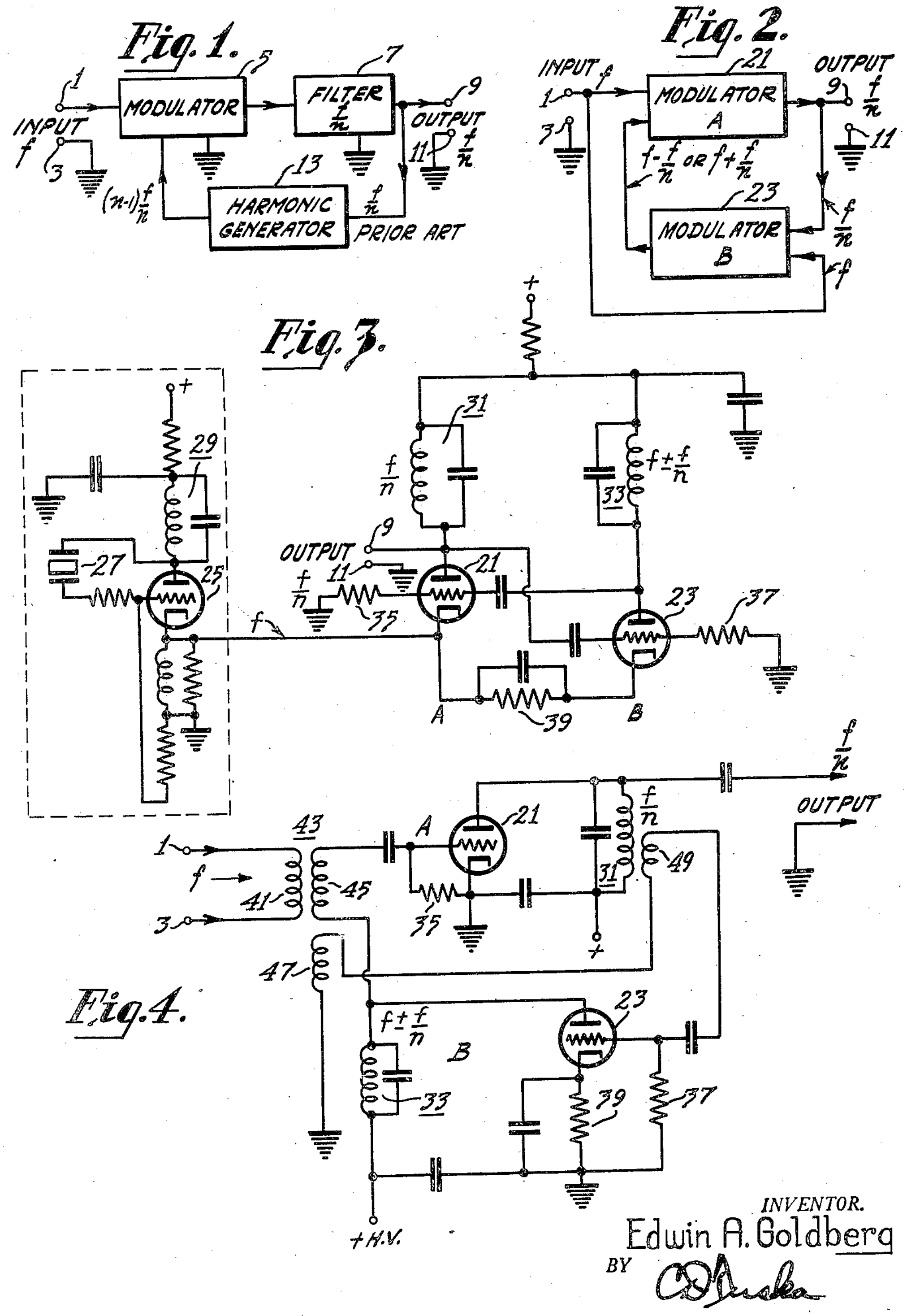

This invention relates generally to sinusoidal current generation and more particularly to an improved frequency dividing network for a source of alternating current.

Heretofore the most common types of frequency dividers have included multivibrators or harmonic generators combined with filter networks. Multivibrator circuits have a number of disadvantages which prevent their use for some applications of frequency dividing networks. Inherently, the multivibrator is a self-oscillating circuit which produces a sawtooth output signal which may be easily locked in to some submultiple of a driving source frequency. If the lock-in feature is not effective, the multivibrator continues to oscillate at other submultiples of the driving frequency or at its natural frequency. The danger of "off frequency" operation of a multivibrator is further complicated by an annoying tendency of the multivibrator to jump from one submultiple frequency to another. Various circuits have been provided for preventing such off-frequency operation, but the fundamental tendency has never been entirely eliminated. This same defect applies also to controlled oscillator circuits which frequently are employed for frequency division. Due to the sawtooth or irregular wave shape of output signals derived from a multivibrator, it is essential that complicated filtering be provided in order to obtain a sinusoidal output signal.

In an article entitled "A new frequency divider for obtaining reference frequencies," by F. R. Stansel in the Bell Laboratories Record for December 1942, pages 97 to 99, there is described a regenerative frequency divider employing a modulator having a filter in the output circuit thereof tuned to the desired submultiple frequency of a driving source frequency. The submultiple frequency component derived from the filter is applied to a harmonic generator which provides a harmonic output signal which is also applied to the modulator. The beat frequency derived from the driving signal and the harmonic generator signal provides the frequency division signal which is applied to the load. The principal objection to the regenerative frequency divider circuit is that relatively high gain tubes must be employed for both the modulator and the harmonic generator, and stable operation usually cannot be obtained for frequency division ratios of greater than 10 to 1. Therefore, relatively higher frequency division must be accomplished by cascading a plurality of such regenerative frequency dividers.

The instant invention contemplates the use of two modulators wherein one modulator circuit provides a regenerative feedback circuit for the other modulator circuit, and wherein the driving frequency is applied simultaneously to both modulator circuits. Relatively low gain tubes may be employed for both modulators and a convenient embodiment of the invention utilizes a single double-triode thermionic discharge tube for both modulators. The tuned circuits required for segregating the several frequency components in the circuit may comprise simple parallel-resonant inductive-capacitive loops. Due to the fact that the driving frequency is applied simultaneously to both modulators, the gain of the system is relatively high and even when employing triode tubes, the frequency division factor may easily exceed 10 to 1 with stable operation and good sinusoidal output signals having the desired division frequency.

Various embodiments of the invention are described in detail hereinafter. In one embodiment of the invention, the driving frequency is applied to the cathodes of both modulator triodes while the anodes of each of the triodes are coupled, respectively, to the grids of the other triode. Although this circuit resembles a multivibrator, it provides good sinusoidal output at the division frequency and is extremely stable in operation.

A modification of the double modulator circuit applies the driving frequency to the grids of both modulators and also couples the anode circuits of each of the modulators to the grid circuit of the other modulator. The circuit complexity of this modification of the invention is slightly increased by the necessity for coupling coils between the anode circuits of each modulator and the grid circuit of the other modulator as well as by the necessity for an input transformer for the driving frequency.

Among the objects of the invention are to provide an improved method of and means for frequency division of an alternating current source of signal. Another object is to provide an improved frequency dividing circuit having great stability of operation. A further object is to provide a frequency dividing circuit producing a substantially sinusoidal output signal. An additional object is to provide a frequency dividing circuit employing a pair of thermionic tube modulators in a regenerative feedback circuit. Another object is to provide a frequency dividing circuit permitting a high ratio of frequency division with a sinusoidal signal output and high stability of operation. An additional object is to provide a frequency dividing circuit utilizing a pair of triode thermionic tubes, each operated as modulators, wherein one modulator provides a regenerative feedback circuit for the other modulator. A still further object of the invention is to provide an improved frequency dividing circuit having relatively high loop gain while utilizing relatively low gain thermionic tubes as regeneratively-connected modulators and wherein complex filter networks are eliminated.

The invention will be described in greater detail by reference to the accompanying drawing of which Figure 1 is a block schematic circuit diagram of a regenerative frequency divider circuit known in the prior art, Figure 2 is a block schematic circuit diagram of the basic circuit according to the invention herein, Figure 3 is a schematic circuit diagram of a first embodiment of the invention, and Figure 4 is a schematic circuit diagram of a second embodiment of the invention. Similar reference characters are applied to similar elements throughout the drawing.

Referring to the drawing, Figure 1 illustrates in block form the prior art system employing a regenerative frequency divider. Input terminals 1, 3 are coupled to the input of a thermionic tube modulator 5, which preferably comprises a high mu multigrid tube. The output of the modulator is coupled through a filter network 7 to output terminals 9, 11. The filter 7 is tuned to pass substantially only the desired submultiple $f/n$ of the driving frequency $f$ applied to the input terminals 1, 3. The frequency $f/n$ derived from the output circuit is applied to the input circuit of a harmonic generator 13 which may comprise, for example, a distortion amplifier utilizing a high gain tube such as a multigrid tube. The frequency component $(n-1)f/n$ derived from the harmonic generator 13 also is coupled to the input circuit of the modulator 5 to produce the difference frequency component $f/n$ in the output circuit of the modulator as well as other modulation components which are rejected by the filter circuit 7. The efficiency of the circuit in frequency division is limited by the ability of the harmonic generator to supply the harmonic frequency $(n-1)f/n$ with sufficient amplitude to actuate the modulator 5. The circuit operation is initiated by means of the regenerative action of the feedback circuit which includes the harmonic generator.

In Figure 2 the system according to the instant invention includes input terminals 1, 3 coupled to the input circuit of a first modulator 21 and to the input circuit of a second modulator 23. Both modulators may comprise, for example, relatively low gain triode thermionic tubes having parallel-resonant output circuits for selecting the desired frequency components. The driving frequency $f$ is applied to the input circuit of the first modulator 21 which also is actuated by an additional signal having a frequency $(f-f/n)$ or $(f+f/n)$ which is derived from the second modulator 23. The second modulator 23 also is coupled to the output of the first modulator 21 providing for the second modulator an input frequency having a frequency $f/n$. Thus, the second modulator 23 provides a regenerative feedback circuit for the first modulator 21. In order for the frequency dividing network to divide by an integer, the output of the second modulator 23 must be an integral multiple of its input frequency $f/n$ as well as the sum or difference of the frequencies $f$ and $f/n$. This operating condition is insured by overbiasing the second modulator 23. The overbias condition increases the tendency for the output frequency of the second modulator 23 to be an integer times $f/n$ rather than a non-integral function of $f/n$.

The employment of a modulator for the circuit element 23 rather than a conventional frequency multiplier, as previously employed in the prior art devices, permits frequency division by a greatly increased factor although utilizing low gain triodes instead of the multigrid tubes required in the prior art systems. The instant system provides high loop gain and great stability because of the increased efficiency of the second modulator 23 which is energized by the driving frequency $f$ as compared to the relatively low efficiency signal magnitude realizable at higher harmonics in a conventional frequency multiplier.

Figure 3 is a schematic circuit diagram of a first embodiment of the invention which includes a driving frequency comprising a piezo crystal oscillator including a triode 25. The piezo crystal 27 is coupled between the anode and grid electrodes of the oscillator tube 25. The anode circuit includes a parallel-resonant tank circuit 29. The driving frequency signals (having, for example, a frequency of 82 kilocycles) is derived from the oscillator cathode circuit and applied to the cathodes of first and second modulator triodes 21, 23.

The anode circuit of the first modulator tube 21 includes a parallel-resonant circuit 31 tuned, for example, to the tenth subharmonic frequency 8.2 kilocycles. Similarly the anode circuit of the second modulator tube 23 includes a second parallel-resonant circuit 33 tuned to either of the frequencies $(f \pm f/n)$. The positive terminal of the anode voltage source, not shown, is connected through the two resonant circuits 31 and 33 to the anodes of the first and second modulators 21, 23. The anode of the first modulator 21 is connected to the output terminal 9 and is connected through a small coupling capacitor to the control electrode of the second modulator 23. Likewise, the anode of the second modulator 23 is connected through a similar small coupling capacitor to the control electrode of the first modulator 21. The control electrode circuits of the modulators 21 and 23 include grid bias resistors 35, 37, respectively.

Thus, by employing a single type 6SL7 double-triode tube, frequency division of the input signal may be accomplished with great stability and within wide frequency limits. In operation the 82 kilocycle signal $(f)$ is applied simultaneously to the cathode circuits of the two modulators. In a typical example, the 73.8 kilocycle signal $(f-f/10)$ is applied to the grid of the first modulator tube 21 and the 8.2 kilocycle output frequency component $(f/10)$ is coupled to the output terminals and to the grid of the second modulator tube 23. Both modulator tubes operate as grid leak biasing modulators. The output signals are of substantially sinusoidal waveform and do not require complex filters for wave shaping. The additional bias voltage for the second modulator tube 23 is provided by the cathode resistor 39 connected between the cathodes of the modulator tubes.

Figure 4 shows a second embodiment of the instant invention wherein the driving frequency $f$ is applied to the input terminals 1, 3 which are connected to the primary winding 41 of an input coupling transformer 43 having first and second secondary windings 45, 47. The first secondary winding 45 is coupled to the grid of the first modulator tube 21. The anode of the first modulator tube 21 is coupled through the first parallel-resonant circuit 31 to the positive terminal of the anode voltage source, not shown. The first parallel-resonant circuit is tuned to the desired division frequency $f/n$. The anode of the first modulator tube 21 is coupled to the output terminal 9.

The second secondary winding 47 of the input transformer 43 is serially-connected with a coupling winding 49 which is coupled to the first resonant circuit 31, and both windings are thence capacitively coupled to the grid of the second modulator tube 23, whereby signals of the input frequency $f$ as well as signals of the output frequency $f/n$ are both applied to the grid circuit of the second modulator tube. The anode circuit of the second modulator tube 23 includes a second parallel-resonant circuit 33 tuned to the sum or difference frequencies of the applied frequency components $f$ and $f/n$. The anode of the second modulator 23 is conductively coupled through the first secondary winding 45 of the input transformer 43 to the grid of the first modulator 21. The cathode of the first modulator 21 is grounded and additional bias is provided for the cathode of the second modulator 23 by means of the cathode resistor 39.

It should be understood that plate current modulators, that is, detectors operating at cut-off bias, might be substituted in either of the circuits described by reference to Figures 3 and 4. The essential operating feature of the circuit is that the driving frequency $f$ must be applied simultaneously to both modulators, and the second modulator must comprise a regenerative feedback circuit for the first modulator.

I claim as my invention:

1. A frequency dividing network for a source of signals of a first predetermined frequency $f$ including a first modulator circuit comprising a first thermionic tube including cathode, anode and grid electrodes and having a cathode circuit responsive to said predetermined frequency $f$, a grid circuit responsive to a frequency $(f-f/n)$ and an anode circuit tuned to a frequency $f/n$, where $n$ is the frequency division factor, a second modulator comprising a second thermionic tube including cathode, anode and grid electrodes and having a cathode circuit responsive to said frequency $f$, a grid circuit, and an anode circuit tuned to said frequency $(f-f/n)$, means for applying said signals of said first predetermined frequency to said cathode circuits of both of said modulator circuits, means connecting said anode circuit of said first modulator circuit to said grid circuit of said second modulator circuit, means connecting said anode circuit of said second modulator circuit to said grid circuit of said first modulator circuit, and means for deriving from said anode circuit of said first modulator circuit signals having a submultiple frequency $f/n$ of said predetermined frequency.

2. A frequency dividing network for a source of signals of a first predetermined frequency $f$ including a first modulator circuit comprising a first thermionic tube including cathode, anode and grid electrodes and having a cathode circuit responsive to said predetermined frequency $f$, a grid circuit responsive to a frequency $(f+f/n)$ and an anode circuit tuned to a frequency $f/n$, where $n$ is the frequency division factor, a second modulator circuit comprising a second thermionic tube including cathode, anode and grid electrodes and having a cathode circuit responsive to said frequency $f$, a grid circuit, and an anode circuit tuned to said frequency $(f+f/n)$, means for applying said signals of said first predetermined frequency to said cathode circuits of both of said modulator circuits, means connecting said anode circuit of said first modulator circuit to said grid circuit of said second modulator circuit, means connecting said anode circuit of said second modulator circuit to said grid circuit of said first modulator circuit, and means for deriving from said anode circuit of said first modulator circuit signals having a submultiple frequency $f/n$ of said predetermined frequency.

EDWIN A. GOLDBERG.

REFERENCES CITED

The following references are of record in the file of this patent:

UNITED STATES PATENTS

| Number | Name | Date |
|---|---|---|
| 2,039,923 | O'Brien | May 5, 1936 |
| 2,162,883 | Foster | June 20, 1939 |
| 2,344,678 | Crosby | Mar. 21, 1944 |